Nov. 26, 1957 G. S. DUNN 2,814,289
CRUST RING
Filed May 21, 1953
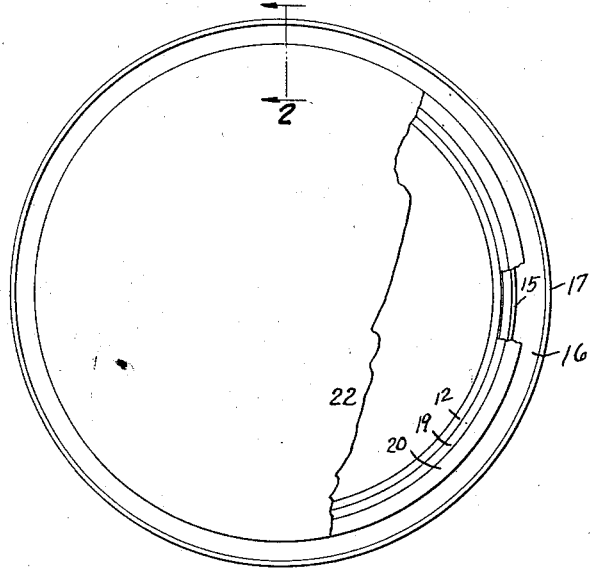
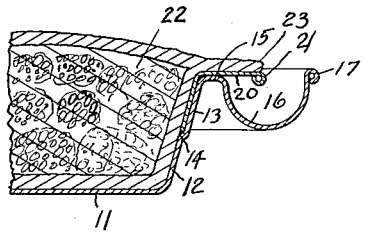
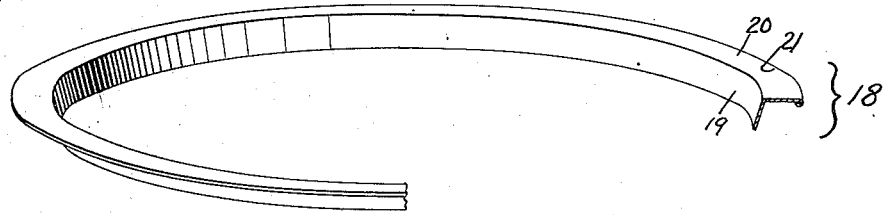
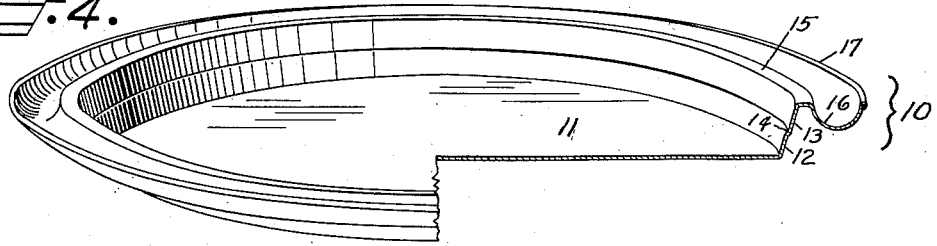
INVENTOR
GERTRUDE S. DUNN
BY
ATTORNEY United States Patent Office 2,814,289
Patented Nov. 26, 1957

2,814,289
CRUST RING
Gertrude S. Dunn, Portland, Oreg.
Application May 21, 1953, Serial No. 356,361
3 Claims. (Cl. 126—385)

This invention relates generally to the bakers art and particularly to a crust ring for pie pans and the combined use thereof.

The main object of this invention is to prevent the sealing of a crust to the rim of a pie pan.

The second object is to facilitate the removal of a pie from the pan without the loss of crust around the edge.

The third object is to so collect the juices that they will not run toward the crust when over-flowing into the trough.

The fourth object is to facilitate the washing of the pan.

The fifth object is to increase the juice retaining capacity without materially increasing the outside diameter of the pan.

The sixth object is to produce the device in a manner that it will be easy to construct and maintain in a sanitary condition.

I accomplish these and other objects in the manner set forth in the following specification as illustrated in the accompanying drawing, in which Fig. 1 is a plan of the pan and crust ring, showing a pie contained therein with parts of the pie and ring broken away.

Fig. 2 is a fragmentary section taken along the line 2—2 in Fig. 1.

Fig. 3 is a fragmentary perspective view of the crust ring.

Fig. 4 is a fragmentary perspective view of the pie pan.

Like numbers of reference refer to the same or similar parts throughout the several views.

Referring in detail to the drawing, there is shown in Fig. 4 a pie pan 10 having a flat bottom 11 and sloping side wall 12, whose upper portion 13 is slightly offset to form a shoulder 14 approximately at the middle of the side wall 12.

Around the top of the pan and merging with the wall portions 13 is a flat land or top edge 15 around which is formed a half-round trough 16 whose upper edge 17 is preferably beaded.

In Fig. 3 is shown a crust ring 18 having a downturned flange 19 which normally rests against the portion 13 of the pan 10. The ring 18 has an outturned flange 20 which projects horizontally beyond the top edge 15. The extending outer edge 21 of the flange 20 is preferably beaded.

It will be seen in Fig. 2 that the outer edge 21 of the rim 18 extends to the middle of the semi-circular trough 16, and the juice which has boiled out of the pie 22 falls into the middle of the trough rather than draining across the surface of the rim or pan and the results above enumerated are obtained.

It will be seen by an inspection of Fig. 2 that the outermost crust 23 of the pie 22 rests upon the flange 20 above the contents of the trough 16. Therefore, as steam escapes from the baking of the crust over the top of the flange 20, the juice cannot flow back between the crust 23 and the flange 20, causing them to adhere when the pie is baked.

I claim:

1. The combination with a pie pan having a downwardly and inwardly sloping side wall, said side wall being offset radially outward at a position intermediate its height to provide a slightly offset circumferential portion adjacent the rim of the pie pan and said rim extending horizontally outward to provide a flat top edge, of a separate, removable crust ring having a downwardly and inwardly sloping wall interfitting within the offset circumferential portion of the pie pan, the wall of the crust ring corresponding in thickness to the offset of the circumferential portion of the side wall of the pie pan so as to produce with the side wall of the pie pan a smooth, substantially uninterrupted inner circumferential surface between the top and bottom of said pie pan and said crust ring having a circumferential flange resting upon the flat top edge of the pie pan and extending horizontally outwardly a substantial distance beyond the peripheral edge of the pie pan such as to cause the juices dripping from the outer edge of the flange of the crust ring to fall clear of contact with any portion of the top edge of the pie pan whereby to prevent the migration of juices from the upper surface of the flange to its lower surface and between the contacting surfaces of the crust ring and the pie pan.

2. The combination with a pie pan having a downwardly and inwardly sloping side wall, said side wall being offset radially outward at a position intermediate its height to provide a slightly offset circumferential portion adjacent the rim of the pie pan and said rim extending horizontally outward to provide a flat top edge terminating in a shallow circumferential trough encircling the pie pan and serving as a receptacle for juices, of a separate, removable crust ring having a downwardly and inwardly sloping wall interfitting within the offset circumferential portion of the pie pan, the wall of the crust ring corresponding in thickness to the offset of the circumferential portion of the side wall of the pie pan so as to produce with the side wall of the pie pan a smooth, substantially uninterrupted inner circumferential surface between the top and bottom of said pie pan and said crust ring having a circumferential flange resting upon the flat top edge of the pie pan and extending horizontally outwardly to a position overhanging the trough of the pie pan whereby to prevent the migration of juices from the upper surface of the flange to its lower surface and between the contacting surfaces of the crust ring and the pie pan.

3. The combination with a pie pan having a downwardly and inwardly sloping side wall, said side wall being offset radially outward at a position intermediate its height to provide a slightly offset circumferential portion adjacent the rim of the pie pan and said rim extending horizontally outward to provide a top edge terminating in a shallow circumferential trough encircling the pie pan and serving as a receptacle for juices, of a separate, removable crust ring having a downwardly and inwardly sloping wall lying within the offset circumferential portion of the pie pan, the wall of the crust ring lying wholly within the offset of the circumferential portion of the side wall of the pie pan so as to produce with the side wall of the pie pan a smooth, substantially uninterrupted inner circumferential surface between the top and bottom of said pie pan and said crust ring having a circumferential flange resting upon the top edge of the pie pan and extending horizontally outwardly to a position overhanging the trough of the pie pan whereby to prevent the migration of juices from the upper surface of the flange to its lower surface and between the contacting surfaces of the crust ring and the pie pan.

References Cited in the file of this patent

UNITED STATES PATENTS

| | | |
|---|---|---|
| 274,219 | Parsons | Mar. 20, 1883 |
| 505,364 | MacIntosh | Sept. 19, 1893 |
| 613,752 | Braime et al. | Nov. 8, 1898 |
| 764,078 | Stokes | July 5, 1904 |
| 887,852 | Sabin | May 19, 1908 |
| 1,957,013 | Howard | May 1, 1934 |
| 1,974,443 | Bean | Sept. 25, 1934 |
| 2,079,281 | Duarte | May 4, 1937 |

FOREIGN PATENTS

| | | |
|---|---|---|
| 2,055 | Great Britain | of 1903 |
| 12,897 | Great Britain | May 25, 1911 |